Dec. 3, 1946.  W. M. STEWART  2,412,104
METHOD OF SINTERING IRON ORE SLUDGE
Filed July 2, 1942   2 Sheets-Sheet 1
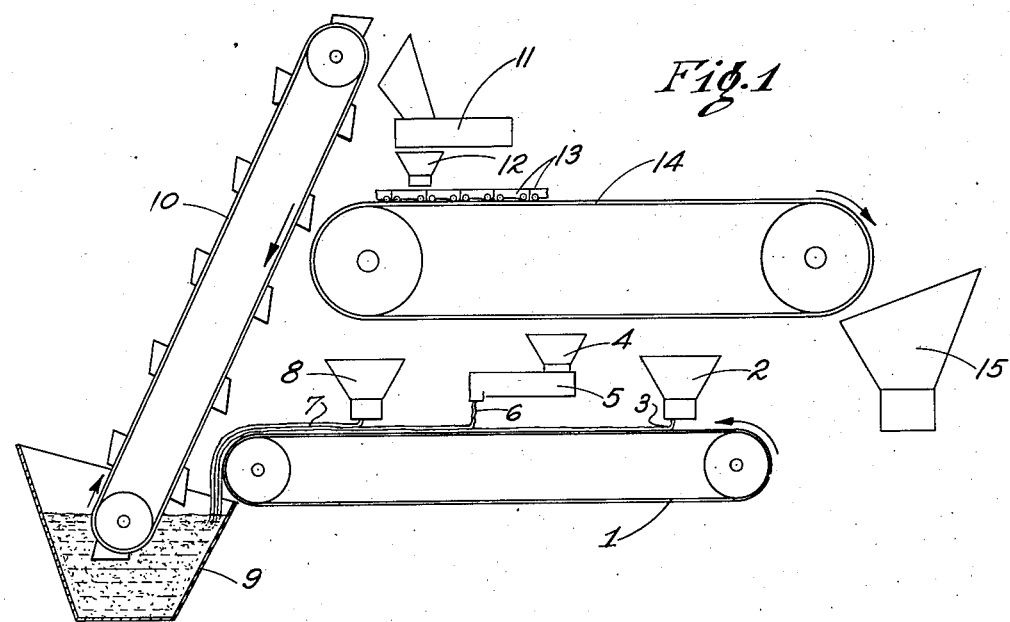
Fig. 1
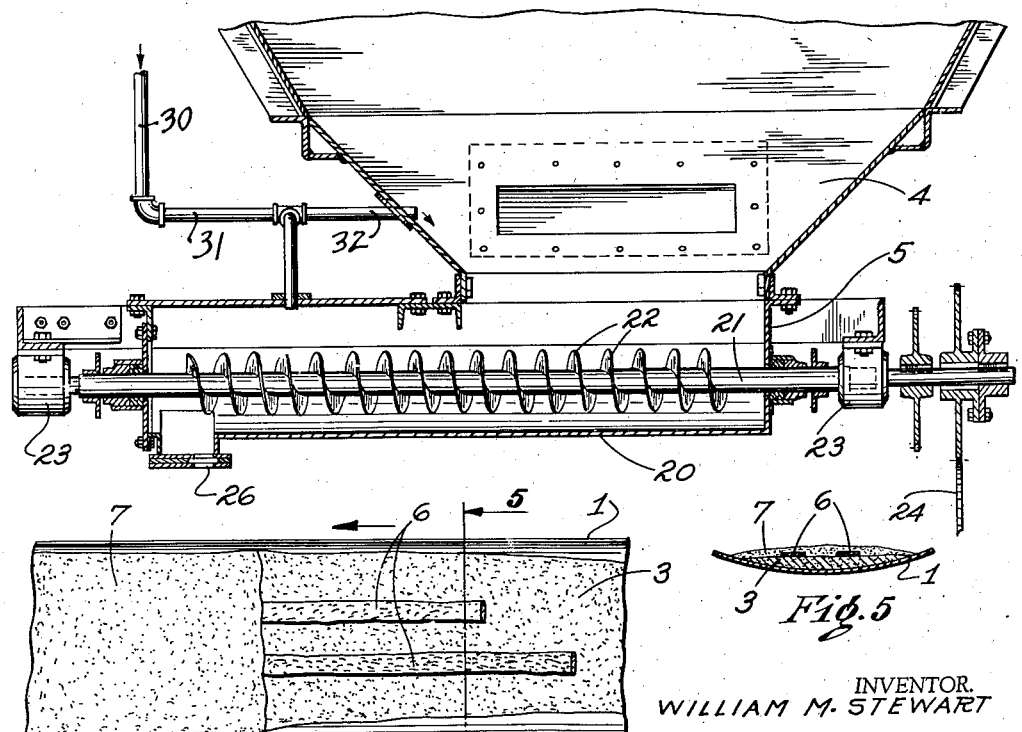
Fig. 3
Fig. 4
Fig. 5
INVENTOR.
WILLIAM M. STEWART
BY Richey & Watts
ATTORNEYS

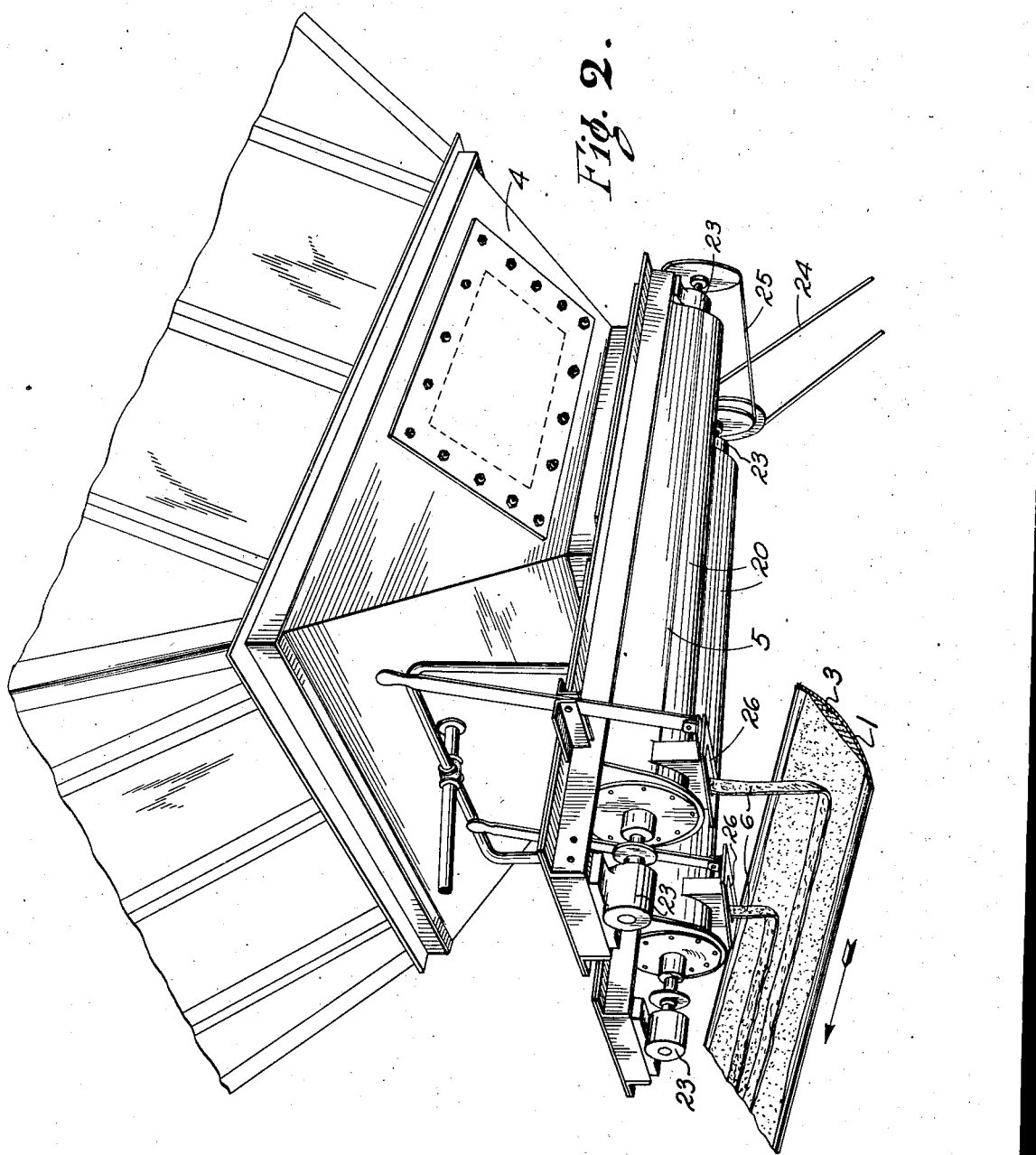

Patented Dec. 3, 1946

2,412,104

UNITED STATES PATENT OFFICE 2,412,104

METHOD OF SINTERING IRON ORE SLUDGE

William M. Stewart, Birmingham, Ala., assignor to Republic Steel Corporation, Cleveland, Ohio, a corporation of New Jersey Application July 2, 1942, Serial No. 449,376

5 Claims. (Cl. 75—5)

This invention relates generally to the art of sintering ores or concentrates, and more particularly to the sintering of finely divided iron ore materials containing large amounts of water.

Altho iron ore fines containing small amounts of moisture have been sintered commercially heretofore, no one has ever been able successfully to sinter iron ore containing large amounts of moisture, such as iron ore sludge, so far as I am aware. There exist quantities of iron ore fines or concentrates in the form of sludge containing amounts of moisture ranging up to more than 20% which would yield quantities of iron if they could be sintered satisfactorily.

The difficulties in the way of sintering such sludge-like materials are numerous and serious. The sludge contains large amounts of water and retains more than 20% of water which can not be removed by drainage or any other inexpensive method of separation. When attempts are made to mix dry sintering materials with the sludge, even that from which as much moisture as possible has been removed, the sludge forms balls with an adherent outer layer of dry material, and these balls can not be broken in the ordinary pug mill used to mix charges for the sintering machine. When dry materials containing these balls are run thru a sintering machine they are not uniformly sintered for the dry materials burn and sinter before the moisture can be driven out of these balls.

The present invention overcomes the previous difficulties and makes possible the economical sintering of sludge concentrates and other iron ore materials containing large amounts of moisture.

According to the present invention high moisture containing iron ore material, such as sludge, is spread out in thin, narrow ribbons on a thin, relatively wide, layer of substantially dry sintering materials and may also be covered with the latter. The amounts of these materials are so proportioned that the mixture will have an average moisture content of between about 5% and about 15%, preferably about 7%. Then these materials are thoroughly mixed and are run thru a sintering machine. In this manner the sludge-like ore or concentrates are made suitable for reduction.

In the drawings accompanying and forming a part of this specification,

Figure 1 shows diagrammatically one form of apparatus for carrying out the process of the present invention;

Figure 2 is a perspective view of one form of apparatus suitable for carrying out one step of the present process;

Figure 3 is a vertical sectional view taken on a plane parallel to and between the screw conveyors of Fig. 2;

Figure 4 is a top plan view of the conveyor with dry and sludge materials thereon; and, Figure 5 is a transverse cross-sectional view taken on line 5—5 of Fig. 4.

In Figure 1 the top reach of the endless belt I moves from right to left. As it passes under hopper 2 substantially dry sintering materials, such as flue dust, coke breeze, coal or mixtures of two or more of these materials are spread onto the belt in the form of a stream 3 (Figs. 4 and 5) which may be nearly as wide as the belt, and may range between about 2" and about 6" in thickness at the middle of the belt where it is thickest. As the belt passes under the hopper 4, screw conveyors 5 force iron ore material containing large quantities of moisture, such as sludge which may contain more than 20% of water, onto the stream of dry materials on the conveyor in the form of one or more ribbons 6 which are small in cross-section and which may be variously shaped in cross section and which may, for example, be approximately ½" to ¾" thick and from 2" to 2½" wide. Altho it is not necessary, additional substantially dry sintering materials 7 may, if desired, be delivered on top of the stream 3 and ribbons 6 from hopper 8. These materials may be the same as those coming from hopper 2, and making up the initial stream or may be one or another of those materials.

The amounts of substantially dry materials discharged onto the conveyor from hoppers 2 and 8 are so proportioned with respect to the amount of iron ore materials discharged from the screw conveyors 5 that the average moisture content of the combined materials will be the amount desired for good sintering practice, ranging from about 5% to about 15%, usually about 7%.

The materials 3, 6 and 7 on belt I may be discharged into the hopper 9 from which they may be transferred, as by conveyor 10 to a mixing drum or pug mill 11 in which they are thoroughly and uniformly mixed. Then the mixture is discharged into a hopper 12 and fed onto the pallets 13 of a sintering machine indicated diagrammatically at 14, and finally the sintered material is discharged into hopper 15.

Figs. 2 and 3 show in some detail the hopper 4 and screw conveyors 5 of Fig. 1. The hopper 4 has a top opening into which wet iron ore or concentrates, in the form of sludge and the like, may be discharged and at the bottom has two screw conveyors enclosed in housings 20. Each screw conveyor includes a shaft 21 having a screw 22. These conveyors are enclosed by housings 20, are supported in bearings 23, and are rotated by chains 24 and 25. Each housing has a valve controlled outlet 26, the two outlets being staggered so that the two ribbons 6 will not overlap each other on belt 1.

Preferably, means are provided for tempering the sludge, that is, adjusting the consistency of various lots to a standard or uniform amount of moisture. As illustrated, this means includes a water line 30 with connections 31 and 32 to the interior of the housing 20 and hopper 4. Usually little or no water need be added by this means.

While screw conveyors of different capacities may obviously be employed, success has been had with screw conveyors which had a capacity of about 20,000 pounds per hour of material weighing about 120 pounds per cubic foot and containing about 22¼% of moisture when the screws rotated at about 80 R. P. M. These screws were about 6" in outside diameter with a 3" pitch and the openings 26 were of the sizes above stated. By adjusting the size of openings 26 at the discharge end of the housings 20 the thickness of the ribbons 6 of material delivered onto the stream of material on the belt conveyor 1 can be regulated as desired.

It will be understood that when the ribbons of sludge are laid on the dry fines on the belt, the fines which contact with the ribbons adhere thereto and absorb some moisture therefrom. A similar action takes place if and when dry fines are delivered onto the ribbons. When the materials are discharged from the belt the ribbons break up into short lengths and more dry fines adhere to the thus exposed surfaces thereof. This action is repeated while the material is being conveyed to the pug mill, while it is being tumbled therein and when it is discharged into and thru the hopper onto the pallets. As a result of starting with thin narrow ribbons of sludge on dry fines amounting to several times the volume of the sludge, and treating the mixture as described, the sludge reaches the pallets in the form of uniformly divided particles which have been partly dehydrated by the dry fines and which are thoroughly mixed with combustible fines. These pieces are quickly dried out and are readily ignited and sintered on the sintering machine.

It will be understood that the use of the screw conveyor makes it possible to proportion the amount of iron bearing materials, such as ore or concentrates, which is added to the other materials. In other words, the percentage of such iron bearing material as well as the percentage of the iron values themselves in the sintering mixture may be closely controlled by the method of this invention.

Having thus described my invention so that others skilled in the art may be able to understand and practice the same, I state that what I desire to secure by Letters Patent is defined in what is claimed.

What is claimed is:

1. The method of sintering which includes the steps of moving sintering material having a low moisture content forwardly in the form of a stream, depositing on said moving stream a thin, relatively narrow ribbon of iron bearing material having a small cross-sectional area and a high moisture content and thereby transferring some of the moisture of the high moisture material to the low moisture materials, and so proportioning the amounts of said materials that the moisture content of the mixture will be between about 5% and about 15%, thoroughly mixing said materials, and sintering the resulting mixture.

2. The method of sintering which includes the steps of moving sintering material having a low moisture content forwardly in the form of a relatively small cross-section stream, depositing on said moving stream a plurality of thin, spaced apart, ribbons of material having a high moisture content, and spreading additional sintering material of low moisture content on said moving materials, and thereby transferring some of the moisture of the high moisture material to the low moisture materials thoroughly mixing said materials, and sintering the resulting mixture.

3. The method of sintering which includes the steps of moving substantially dry sintering material forwardly in the form of a stream, depositing on said moving stream a plurality of relatively thin and narrow ribbons of iron ore materials having a moisture content of above about 20%, and spreading sufficient, additional, substantially dry, sintering material on said moving materials to bring the moisture content of the mixture of said materials to between about 5% and about 15% while preventing the flow of substantial quantities of gas thru said materials, thoroughly mixing said materials, and sintering the resulting mixture.

4. The method of sintering which includes the steps of moving sintering material having a low moisture content forwardly in the form of a stream, depositing on said moving stream, in the form of a thin, relatively narrow ribbon, a quantity of iron ore material having a high moisture content which is sufficient to raise the moisture content of the mixture to above about 7%, and spreading other sintering material of low moisture content on said moving materials while preventing the flow of substantial amounts of gas thru said materials, thoroughly mixing said materials, and sintering the resulting mixture.

5. The method of sintering which includes the steps of moving sintering material having a low moisture content forwardly in the form of a stream, extruding iron bearing material containing approximately 22% of moisture in thin, relatively narrow, ribbon-like form, depositing such extruded material onto said moving stream and so proportioning the amounts of said materials that the moisture content of the mixture will be between about 5% and about 15%, thoroughly mixing said materials, and sintering the resulting mixture.

WILLIAM M. STEWART.